United States Patent
Army et al.

(10) Patent No.: US 12,043,392 B2
(45) Date of Patent: Jul. 23, 2024

(54) RAM EXHAUST MODULE

(71) Applicant: Hamilton Sundstrand Corporation, Charlotte, NC (US)

(72) Inventors: Donald E. Army, Enfield, CT (US); Frederick Peacos, III, North Scituate, RI (US); Roberto J. Perez, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 41 days.

(21) Appl. No.: 17/126,893

(22) Filed: Dec. 18, 2020

(65) Prior Publication Data

US 2022/0194600 A1    Jun. 23, 2022

(51) Int. Cl.
| | |
|---|---|
| *B64D 13/08* | (2006.01) |
| *B64D 13/02* | (2006.01) |
| *B64D 13/04* | (2006.01) |
| *B64D 13/06* | (2006.01) |
| *F04D 19/00* | (2006.01) |
| *F04D 29/54* | (2006.01) |

(52) U.S. Cl.
CPC ............. *B64D 13/08* (2013.01); *B64D 13/02* (2013.01); *B64D 13/04* (2013.01); *F04D 19/002* (2013.01); *B64D 2013/0618* (2013.01); *B64D 2013/0688* (2013.01); *F04D 29/542* (2013.01); *F04D 29/545* (2013.01); *F05D 2250/51* (2013.01); *F05D 2250/52* (2013.01); *F05D 2260/30* (2013.01)

(58) Field of Classification Search
CPC ........ B64D 13/08; B64D 13/02; B64D 13/04; B64D 2013/0618; B64D 2013/0688; B64D 13/00; F04D 19/002; F04D 29/542; F04D 29/545; F05D 2250/51; F05D 2250/52; F05D 2260/30; Y02T 50/50
See application file for complete search history.

(56) References Cited

U.S. PATENT DOCUMENTS

| | | | |
|---|---|---|---|
| 3,471,080 A * | 10/1969 | Gray | F04D 29/522 |
| | | | 415/207 |
| 10,487,848 B2 | 11/2019 | Chrabascz et al. | |
| 2011/0259546 A1 | 10/2011 | Defrancesco et al. | |
| 2013/0097997 A1* | 4/2013 | Chrabascz | F04D 29/541 |
| | | | 29/889.22 |

(Continued)

FOREIGN PATENT DOCUMENTS

| | | |
|---|---|---|
| DE | 10119433 C1 | 8/2002 |
| EP | 2746160 A2 | 6/2014 |
| EP | 2383185 B1 | 6/2017 |

(Continued)

OTHER PUBLICATIONS

European Extended Search Report; European Application No. 21216171.5; Date: May 6, 2022; 9 pages.

*Primary Examiner* — Edelmira Bosques
*Assistant Examiner* — Michael James Giordano
(74) *Attorney, Agent, or Firm* — CANTOR COLBURN LLP (57) ABSTRACT

A ram air module for use in a ram air system, the ram air module includes a diffuser having a diffuser body including an inlet end and an outlet end, a flow diverter assembly connected to the inlet end of the diffuser body, and a valve connected to the outlet end of the diffuser body.

18 Claims, 12 Drawing Sheets

(56) References Cited

U.S. PATENT DOCUMENTS

2014/0178173 A1\* 6/2014 Colson .................. F04D 29/00
                                                            29/428
2016/0097401 A1   4/2016 Beers et al.

FOREIGN PATENT DOCUMENTS

EP           3385171   A1    10/2018
WO       WO9105673    A1 \*   5/1991

\* cited by examiner

FIG. 12

RAM EXHAUST MODULE

BACKGROUND

Embodiments of the present disclosure relate to environmental control system for aircraft, and more specifically, to a flow control through a ram air duct of an environmental control system.

In aircraft environmental control systems, ram air ducts are used to provide a flow of ambient air to interact with various aircraft systems. One or more heat exchangers are positioned within the ram air duct to cool system fluids, such as liquid in a cooling loop or air used in an air conditioning system. Airflow through the ram air duct provides a heat sink for the fluids. During flight, air is forced through the ram air duct dependent on the speed of the aircraft. When not in flight, a fan positioned within the duct is driven to provide airflow. The fan acts as a restriction on airflow during flight and it is, therefore, desirable to bypass the fan to allow sufficient airflow to cool the heat exchangers. At other times, when full heat exchanger cooling flow is not needed, it is desirable to limit interaction of the airflow with the fan to, for example, limit drag and increase fuel efficiency. However, in order to efficiently induce airflow through the duct with the fan, it is desirable to prevent airflow through the duct from bypassing the fan.

Several components are typically positioned within the ram air duct to define a flow path to the fan or to bypass the fan. These components typically require a substantial amount of space and have a limited ease of manufacturability.

BRIEF DESCRIPTION

According to an embodiment, ram air module for use in a ram air system, the ram air module includes a diffuser having a diffuser body including an inlet end and an outlet end, a flow diverter assembly connected to the inlet end of the diffuser body, and a valve connected to the outlet end of the diffuser body.

In addition to one or more of the features described above, or as an alternative, in further embodiments the diffuser, the flow diverter assembly, and the valve are integrally formed.

In addition to one or more of the features described above, or as an alternative, in further embodiments the valve further comprises: a flange extending radially outwardly from the diffuser body adjacent the outlet end of the diffuser body, at least one bypass opening formed in the flange, and at least one valve element mounted to the flange adjacent the at least one bypass opening. The at least one valve element is movable between a first position when the at least one bypass opening is closed and a second position where the at least one bypass opening is at least partially open.

In addition to one or more of the features described above, or as an alternative, in further embodiments comprising at least one biasing mechanism operably coupled to the at least one valve element, wherein a biasing force of the at least one biasing mechanism biases the at least one valve element to the first position.

In addition to one or more of the features described above, or as an alternative, in further embodiments comprising a flow blocker extending radially outwardly from an exterior of the diffuser body.

In addition to one or more of the features described above, or as an alternative, in further embodiments comprising a center body positioned within a hollow interior of the diffuser body.

In addition to one or more of the features described above, or as an alternative, in further embodiments the flow diverter assembly further comprises: a nozzle, a plurality of elements extending from the nozzle, and a plurality of flow passages defined between adjacent elements of the plurality of elements. The plurality of elements are configured to straighten a flow as it passes through the plurality of flow passages.

In addition to one or more of the features described above, or as an alternative, in further embodiments the ram air module further comprises an ejector.

In addition to one or more of the features described above, or as an alternative, in further embodiments the ejector is defined by a clearance between an end of the nozzle and the inlet end of the diffuser body.

In addition to one or more of the features described above, or as an alternative, in further embodiments the ram air module is receivable within a ram air duct of the ram air system.

In addition to one or more of the features described above, or as an alternative, in further embodiments the diffuser, the valve, and at least a portion of the flow diverter assembly is positionable within an annular housing of the ram air duct.

In addition to one or more of the features described above, or as an alternative, in further embodiments the ram air module is interconnected with an environmental control system.

According to another embodiment, a ram air system of a vehicle includes a ram air duct having an inlet for receiving an ambient airflow and an outlet for discharging the ambient air flow overboard. The ram air duct comprises an annular housing and a flange connected to the annular housing. A ram air module is removably mountable within the annular housing. The ram air module includes a diffuser, a flow diverter assembly connected to the diffuser, and a valve connected to the diffuser.

In addition to one or more of the features described above, or as an alternative, in further embodiments when the ram air module is mounted within the annular housing, the diffuser defines a fan duct and a bypass duct.

In addition to one or more of the features described above, or as an alternative, in further embodiments the diffuser, the flow diverter assembly, and the valve are integrally formed.

In addition to one or more of the features described above, or as an alternative, in further embodiments comprising: a fan for moving the ambient air from the inlet to the outlet and a fan housing surrounding at least a portion of the fan. The fan housing is connectable with the annular housing to define a turnabout section of a flow path extending between the inlet and the outlet.

In addition to one or more of the features described above, or as an alternative, in further embodiments the flow diverter assembly includes a nozzle, and when the fan housing is connected to the annular housing, the fan is positioned at least partially within the nozzle.

In addition to one or more of the features described above, or as an alternative, in further embodiments an end of the nozzle is offset from an adjacent end of the diffuser by a clearance, and the clearance defines a recirculation flow path from the nozzle to an inlet of the fan.

In addition to one or more of the features described above, or as an alternative, in further embodiments the valve includes a check valve.

In addition to one or more of the features described above, or as an alternative, in further embodiments the ram air duct is interconnected with an environmental control system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
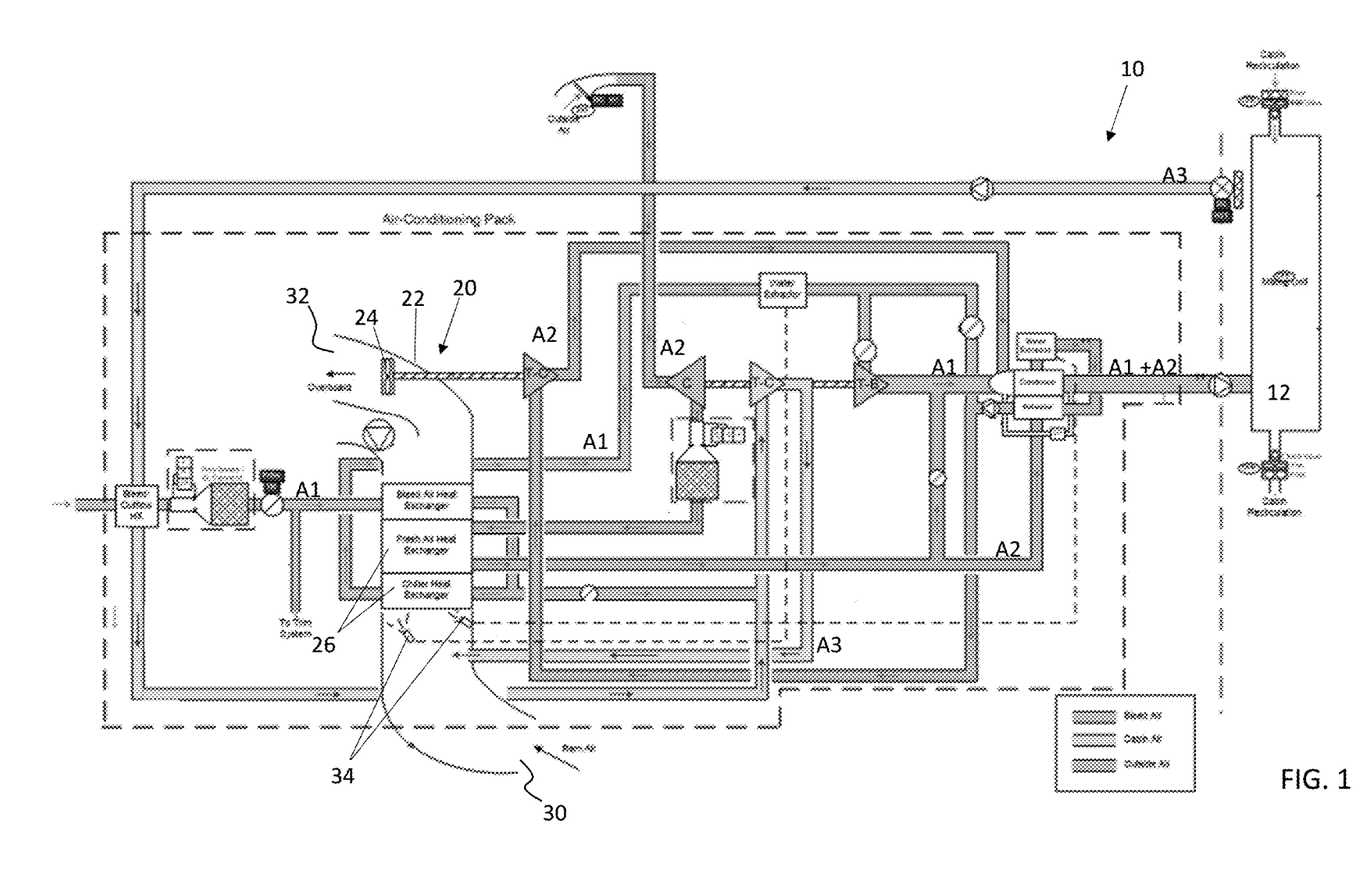
FIG. 1 is a schematic diagram of an environmental control system interconnected with a ram air system according to an embodiment.

With reference now to FIG. 1, a schematic diagram of an example of ram air system 20 interconnected with an environmental control system 10 is illustrated. The ram air system 20 and the environmental control system 10 may be mounted on board a vehicle, such as in an unpressurized bay of an aircraft for example. The environmental control system 10 is operable to condition one or more mediums provided thereto and to deliver a conditioned form of the one or more mediums to one or more loads of the aircraft, such as the cabin or a mixing unit 12 in fluid communication with the cabin for example. Examples of mediums that may be provided to the environmental control system include bleed air A1, fresh air A2, and air returned from a pressurized volume A3, such as the cabin. Bleed air A1 is pressurized air originating from i.e. being "bled" from, an engine or auxiliary power unit of the aircraft. Fresh air A2, such as outside air for example, may be procured via one or more scooping mechanisms, such as an impact scoop or a flush scoop for example. Generally, fresh air A2 as described herein is at an ambient pressure equal to an air pressure outside of the aircraft when the aircraft is on the ground and is between an ambient pressure and a cabin pressure when the aircraft is in flight. Further, the air returned form the pressurized volume A3 may be cabin discharge air, which is air leaving the cabin and that would typically be discharged overboard. The environmental control system 10 illustrated herein is described in more detail in U.S. application Ser. No. 15/793, 585, filed on Oct. 25, 2017, the entire contents of which are incorporated herein by reference. However, it should be understood that an environmental control system having any suitable configuration is within the scope of the disclosure.

The ram air system 20 includes a ram air duct 22, and a fan 24 and at least one heat exchanger 26 are arranged within the interior of the ram air duct 22. A flow of ram air $A_{ram}$ through the ram air duct 22 is induced in response to flight of the aircraft. In addition, operation of the fan 24 is configured to pull ram air or ambient air from an inlet 30 of the ram air duct 22. The portion of the ram air that is output from the fan 24 near the outlet 32 of the ram air duct 22 is referred to herein as fan air. However, a portion of the ram air flowing through the ram air duct 22 is configured to bypass the fan 24. As the ram air flows through the ram air duct 22, the ram air is configured to flow over the one or more heat exchangers 26. Further, the air exhausted from the outlet of the ram air duct 22 may be discharged overboard into the ambient atmosphere surrounding the aircraft.

In the illustrated, non-limiting embodiment, at least one of the heat exchangers 26 is an air-to-air heat exchanger through which a medium, such as bleed air A1 or fresh air A2 flows. Within the heat exchanger 26, the medium is cooled by the flow of ram air moving through the ram air duct 22. Humidity and moisture is removed from at least one medium within a portion of the environmental control system 10, such as at a location with respect to the flow of the at least one medium that is downstream from the ram air system 20. In an embodiment, the ram air system 20 includes at least one spray nozzle 34 positioned generally adjacent the one or more heat exchangers 26. A fluid, such as water for example, removed from the one or more mediums may be supplied to the at least one spray nozzle where the fluid is directed towards the heat exchangers to provide additional cooling capacity with respect to the mediums flowing therethrough.

In an embodiment, a ram air module 40 is removably mountable within the ram air duct 22, such as generally adjacent the outlet 32 of the ram air duct 22. The ram air module 40 is an assembly or cartridge including a plurality of components of the ram air system 20, such as a diffuser and bypass check valve for example. As shown, the ram air module 40 includes a generally hollow body 42 having a first end 44 and a second end 46 through which a flow passes. In an embodiment, the body 42 is generally frusto-conical in shape such that the diameter adjacent the first, inlet end 44 of the body 42 is smaller than the diameter of the second, outlet end 46 of the body 42. As a result, the cross-sectional area of the body 42 increases along the flow path defined within the interior 48 of the body 42. The body 42 forms a diffuser such that as ram air flows through the body 42, the velocity of the ram air is reduced, and the static pressure of the ram air is increased.

Figure 4:
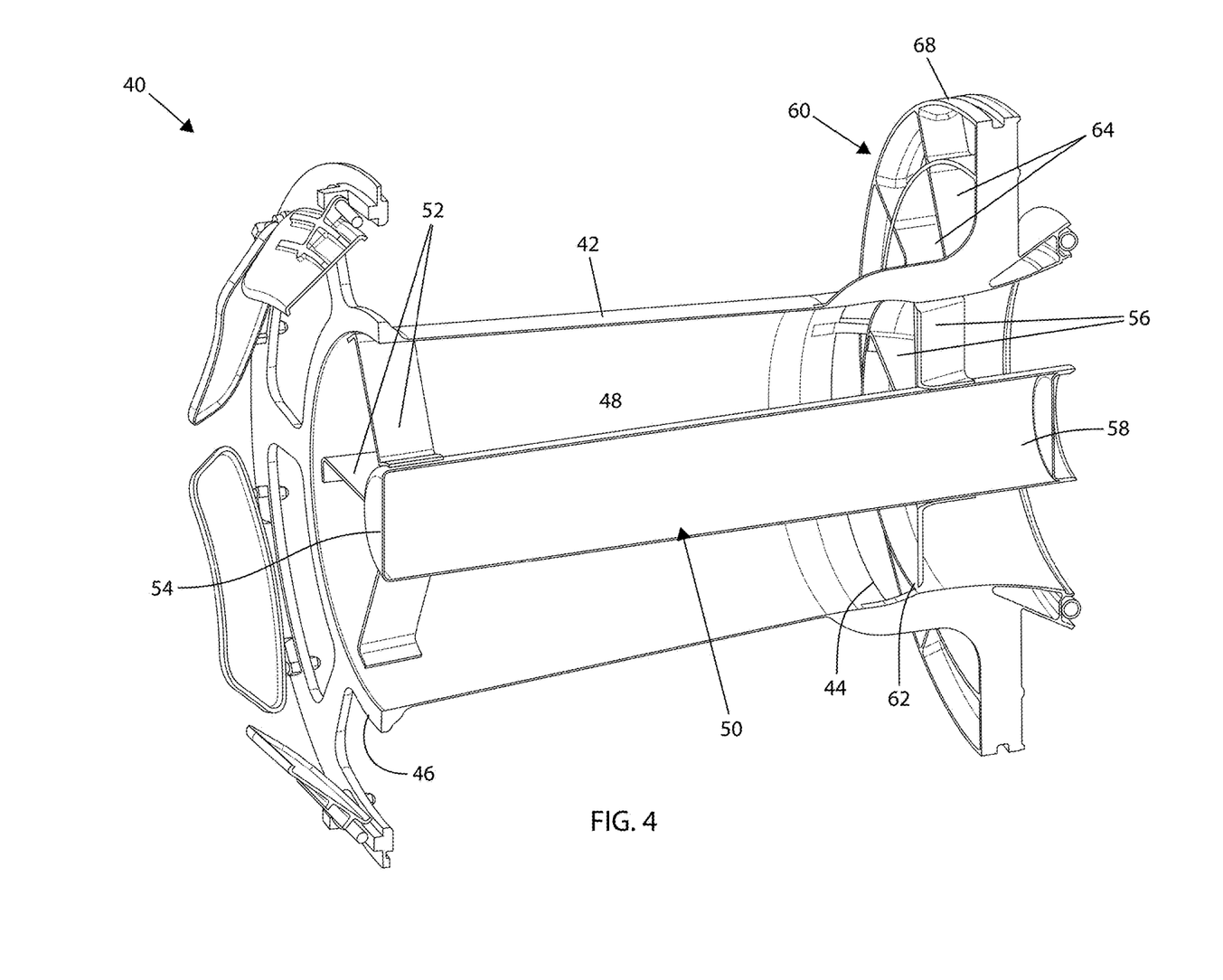
FIG. 4 is a cross-sectional perspective view of the ram air module of FIG. 2 according to an embodiment.

In an embodiment, a center body 50 is located within the hollow interior 48 of the diffuser body 42. As shown, the center body 50 is an elongated piece of material extending generally from the inlet end 44 to the outlet end 46 of the body 42. The diameter of the center body 50 may be substantially uniform over its length, or alternatively, may vary. One or more first de-swirl vanes 52 may be located at or near the downstream end 54 of the center body 50. Alternatively, or in addition, one or more second de-swirl vanes 56 may be located at or near the upstream end 58 of the center body 50. The first and/or second de-swirl vanes 52, 56 may be configured to alter the direction of flow of a fluid passing across them. Although a center body 50 having six first and second de-swirl vanes 52, 56, respectively is illustrated, it should be understood that any number of first or second de-swirl vanes 52, 56, such as two, three, four, five, or more than six de-swirl vanes are contemplated herein. Further, the number of first de-swirl vanes 52 may but need not equal the number of second de-swirl vanes 56 of the center body 50. The de-swirl vanes 52, 56 may extend in a purely radial direction, as shown, or alternatively, may extend at an angle, in both a radial and axial direction. Further, it should be understood that vanes (not shown) may be arranged at another axial location along the center body 50 instead of or in addition to the first and second de-swirl vanes 52, 56 described herein. The center body 50 may be structurally supported within the interior 48 of the diffuser body 42 by the de-swirl vanes 52, 56. In an embodiment, the center body 50 is integrally formed with the diffuser body as a single unitary component.

Figure 2:
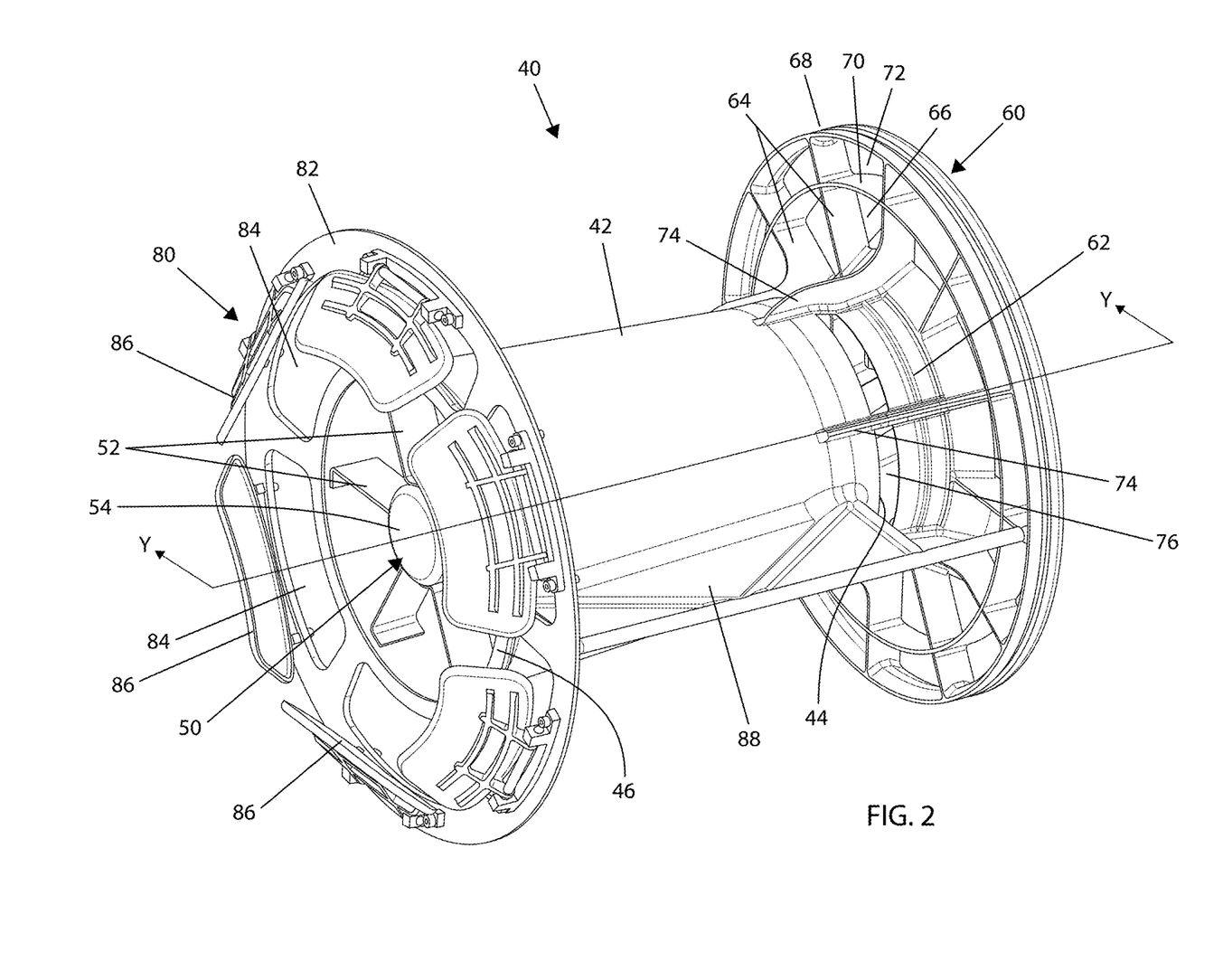
FIG. 2 is a front perspective view of a ram air module according to an embodiment.
Figure 3:
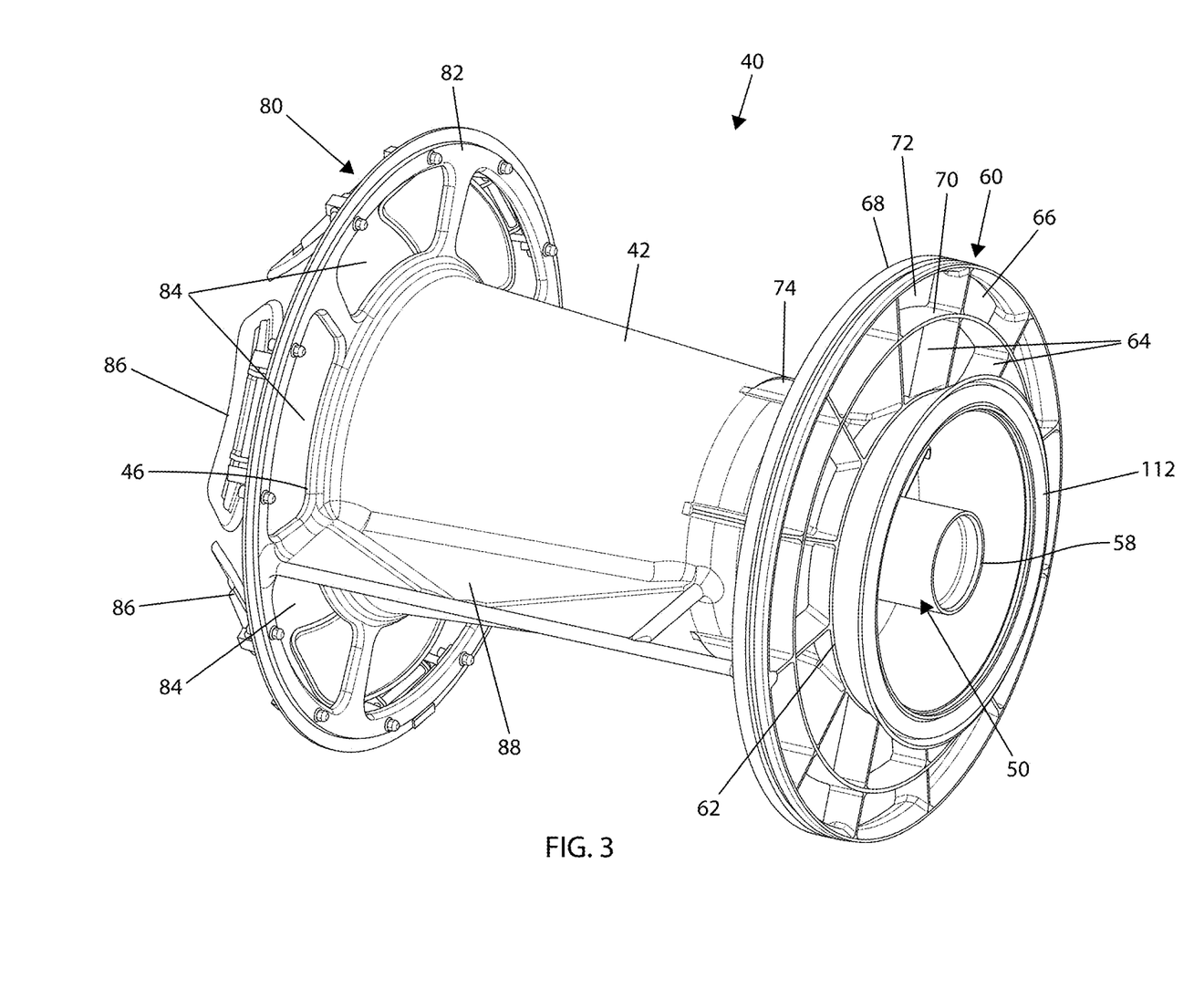
FIG. 3 is a back perspective view of the ram air module of FIG. 2 according to an embodiment.

Arranged at the exterior of the body 42 adjacent the first, inlet end 44 is a flow diverter assembly 60. The flow diverter assembly 60 includes a nozzle 62 and a plurality of elements 64, such as fins or diverter vanes for example, extending radially outward from the nozzle 62. The nozzle 62 may be a separate component mounted to the body 42, or alternatively, may be formed by the body 42 itself. The plurality of radial elements 64 are separated from one another by a distance to define a plurality of external flow passages 66. The distal ends of the one or more of the elements 64 may but need not be connected to a casing 68.

Alternatively, or in addition to the plurality of radial elements 64, the flow diverter assembly 60 may include one or more elements 70 extending circumferentially around the periphery of the nozzle 62 and separated from one another by a plurality of external flow passages 72. When the flow diverter assembly 60 includes both radial and circumferential elements 64, 70, the circumferential elements 70 may extend through an opening formed in at least a portion of the plurality of radial elements 64. Each of the elements 64, 70 may be formed as a single element or a plurality of segmented or multi-vane elements extending between a leading edge and a trailing edge of the nozzle 62 and casing 68.

In an embodiment, the ram airflow $A_{ram}$ moving toward the radial and/or circumferential elements 64, 70 generally has an axial component and a tangential component. The radial and/or circumferential elements 64, 70 can be configured to straighten the flow $A_{ram}$ provided to the fan 24, transforming swirl kinetic energy in the airflow into static pressure rises across the elements 64, 70.

In the illustrated, non-limiting embodiment, the nozzle 62 is separated from the first end 44 of the diffuser body 42 by a distance. In such embodiments, one or more mounting elements 74 may extend axially beyond the edge of the nozzle 62 for connection with the diffuser body 42. In an embodiment, the mounting elements 74 may be integrally formed with the radial elements 64, as shown. However, in other embodiments, the mounting elements 74 may be separate and distinct from the radial elements 64. In an embodiment, the mounting elements 74 and/or another portion of the diverter flow assembly is integrally formed with the diffuser body as a single unitary component.

The clearance or annular passage 76 formed between the nozzle 62 and the inlet end 44 of the body 42 forms an ejector that defines a recirculation flow path. The recirculation flow path supplies flow from the nozzle 62 to an inlet of the fan 24 in the event that the flow provided to the fan is reduced, for instance due to clogging of a heat exchanger 26. This additional flow may increase the surge margin of the fan 24, thereby minimizing the potential for failure of the fan 24.

In an embodiment, a valve 80 is located at or adjacent to the second end 46 of the diffuser body 42. As shown, the valve 80 includes a flange 82 extending radially outwardly from the diffuser body 42, and one or more bypass openings 84 are formed in the flange 82. Although six bypass openings are shown being equidistantly spaced about the flange 82, any number of bypass openings 84 are contemplated herein. Further, the diameter of the flange 82 may but need not be equal to the diameter of the casing 68 of the flow diverter assembly 60.

In the illustrated, non-limiting embodiment, a valve element 86, such as a flap or disk for example, is mounted to the flange 82 adjacent to each of the plurality of bypass openings 84. As shown, the valve elements 86 are movable, for example rotatable about an axis, relative to the flange 82 between a first position and a second position. When a valve element 86 is in the first position, the valve element 86 covers or closes off an adjacent bypass opening 84 such that air is not able to flow through the bypass opening 84. Similarly, when the valve element 86 is in the second position, at least a portion the adjacent bypass opening 84 is exposed (not closed by a valve element 86) and therefore a flow is able to pass through the bypass opening 84. Accordingly, operation of the valve 80 determines how much, if any, ram air is permitted to flow directly into the outlet section as bypass air, bypassing the fan and diffuser.

The valve elements 86 may be movable in unison or independently. In an embodiment, the valve 80 is a check valve and a biasing mechanism, such as a torsion spring for example, is coupled to each valve element 86 to bias the valve element 86 into the first, closed position. In instances where the valve 80 is a check valve, an increase in pressure acting on the valve elements 86 opposes the biasing force of the biasing mechanism, thereby causing the valve elements 86 to rotate from the closed position to the open position. However, in other embodiments, the valve 80 may be operably coupled to an actuator (not shown) and a controller (not shown). The actuator will adjust a position of the valve elements 86 in response to a command generated by the controller, for example in response to a sensed condition adjacent the valve 80.

In an embodiment, the ram air module 40 additionally includes a flange extending radially outwardly from an exterior surface of the diffuser body 42. As shown, the flange 88 is integrally formed with the diffuser body 42 and extends over the substantially entire length of the diffuser, such as from the first end 44 to the second end 46. The outward edge of the flange 88 may be supported at each end via a connection to a portion of the flow diverter assembly 60 and the valve 80, respectively. The flange 88 described herein forms a flow blocker that is configured to minimize recirculation around the diffuser 42.

Figure 5:
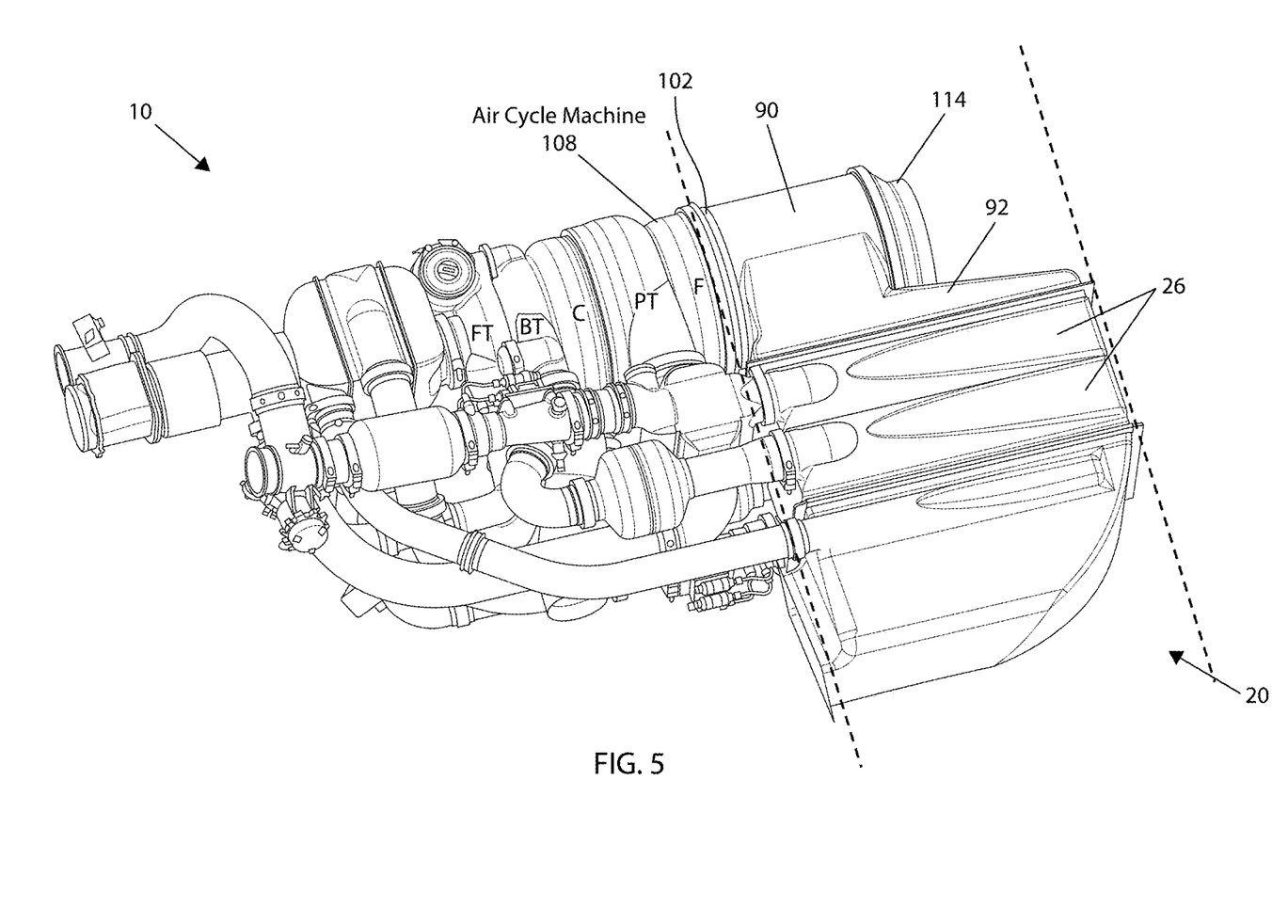
FIG. 5 is a perspective view of an environmental control system interconnected with a ram air system according to an embodiment.
Figure 6:
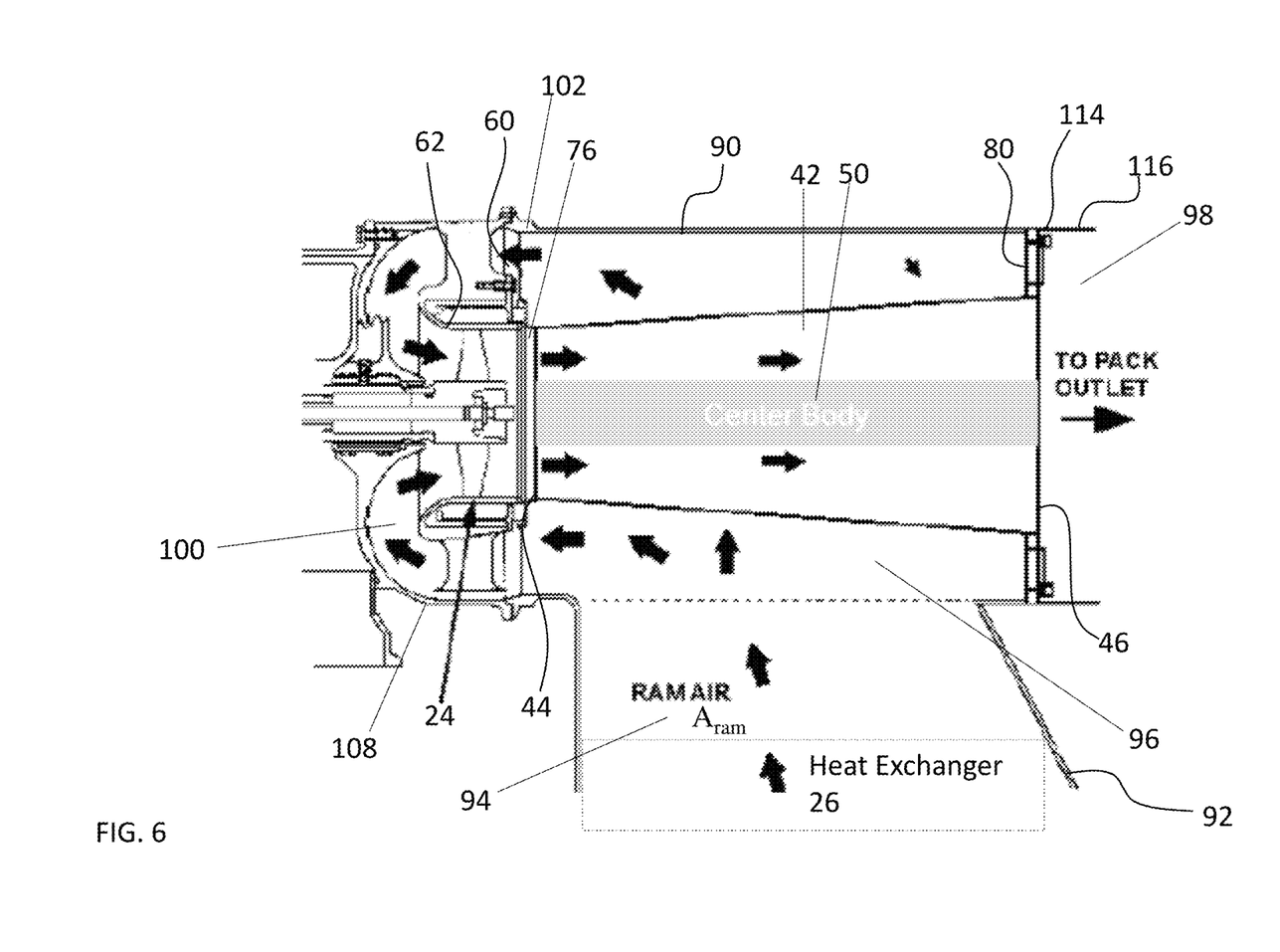
FIG. 6 is a schematic diagram of the ram air module installed within the ram air duct and interconnected with an environmental control system according to an embodiment.
Figure 7A:
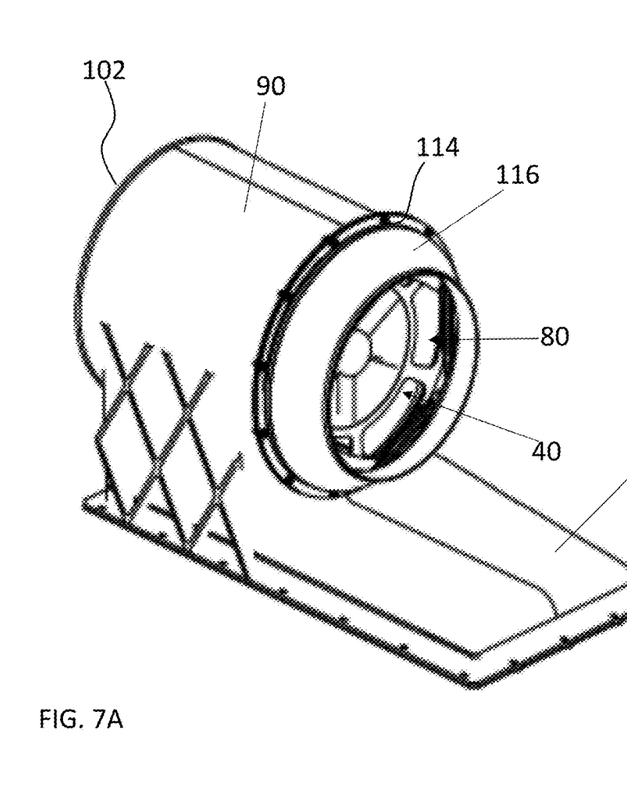
FIGS. 7A and 7B are perspective views of a ram air module installed within the ram air duct according to an embodiment.
Figure 7B:
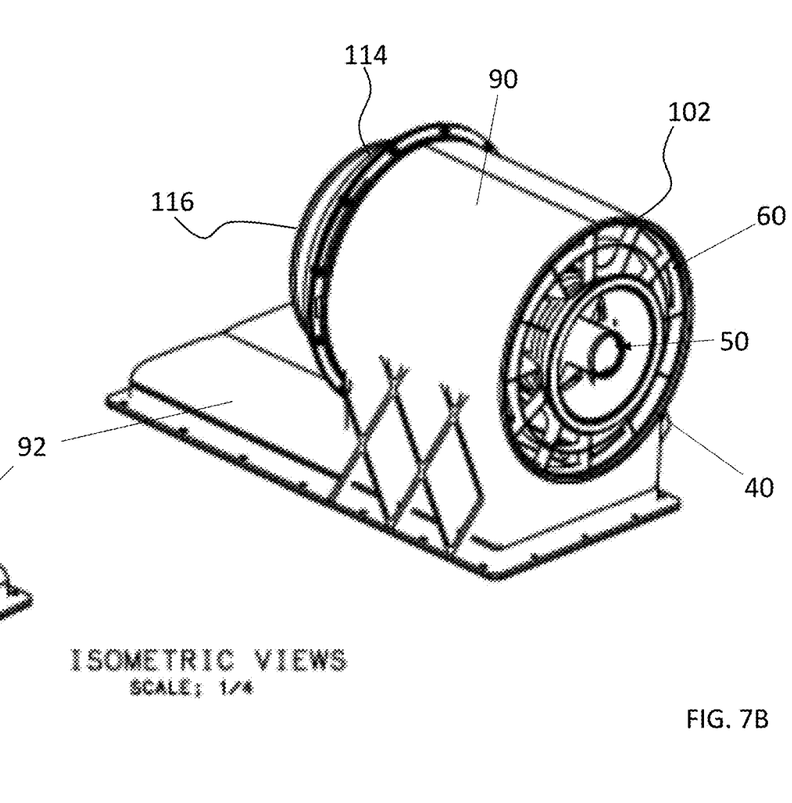
Figure 8A:
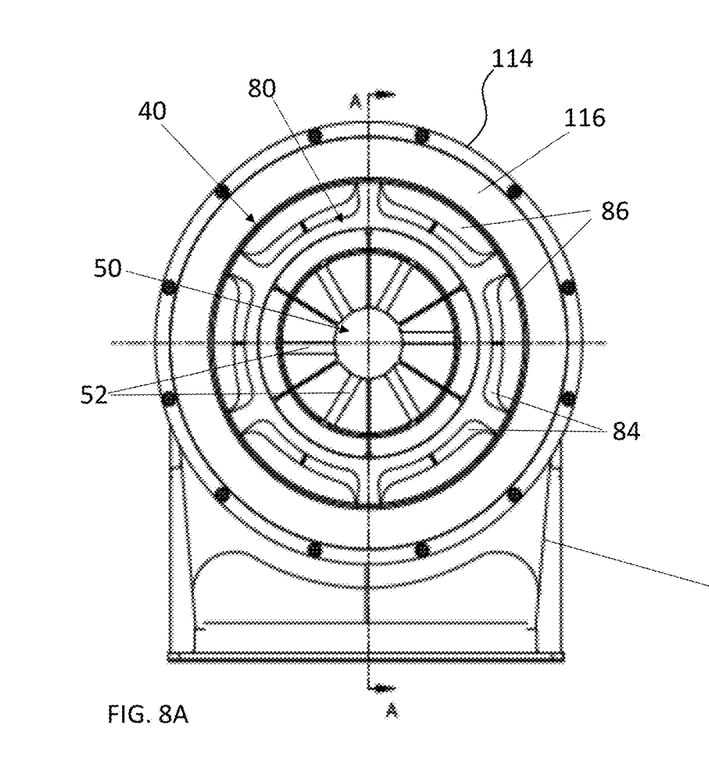
FIGS. 8A and 8B are front and rear views of the ram air module installed within the ram air duct of FIGS. 7A and 7B, respectively, according to an embodiment.
Figure 8B:
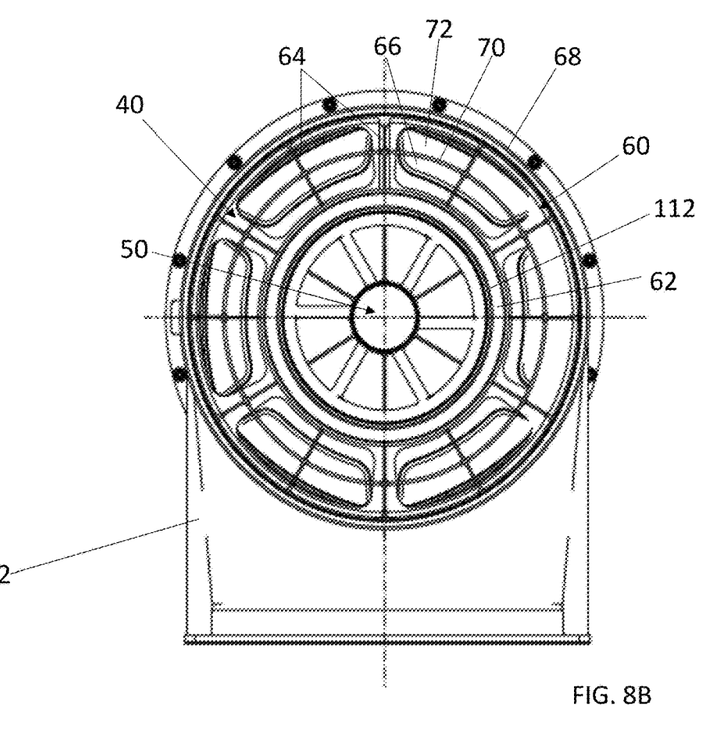
Figure 9:
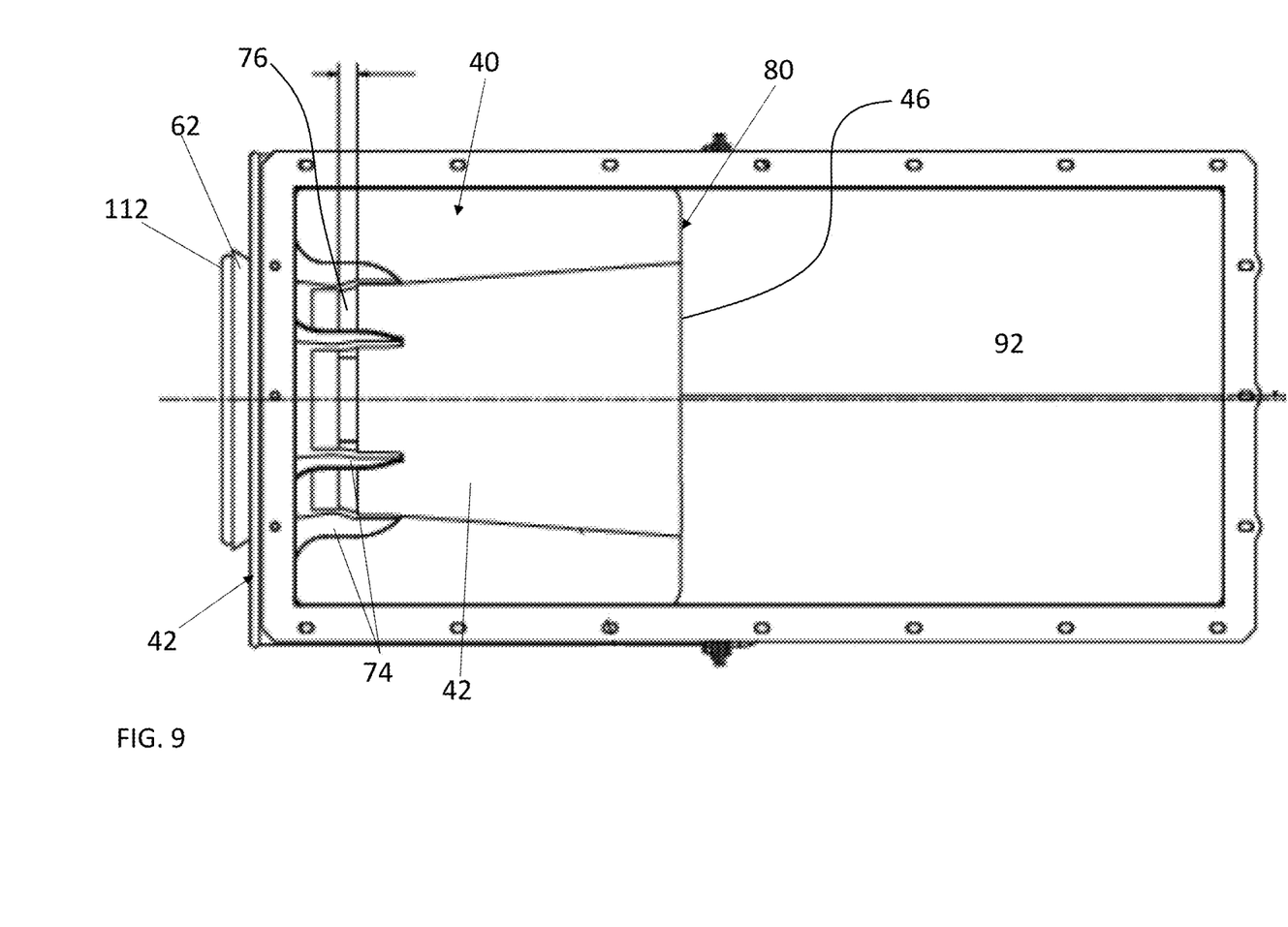
FIG. 9 is a top view of the ram air module installed within the ram air duct according to an embodiment.
Figure 10:
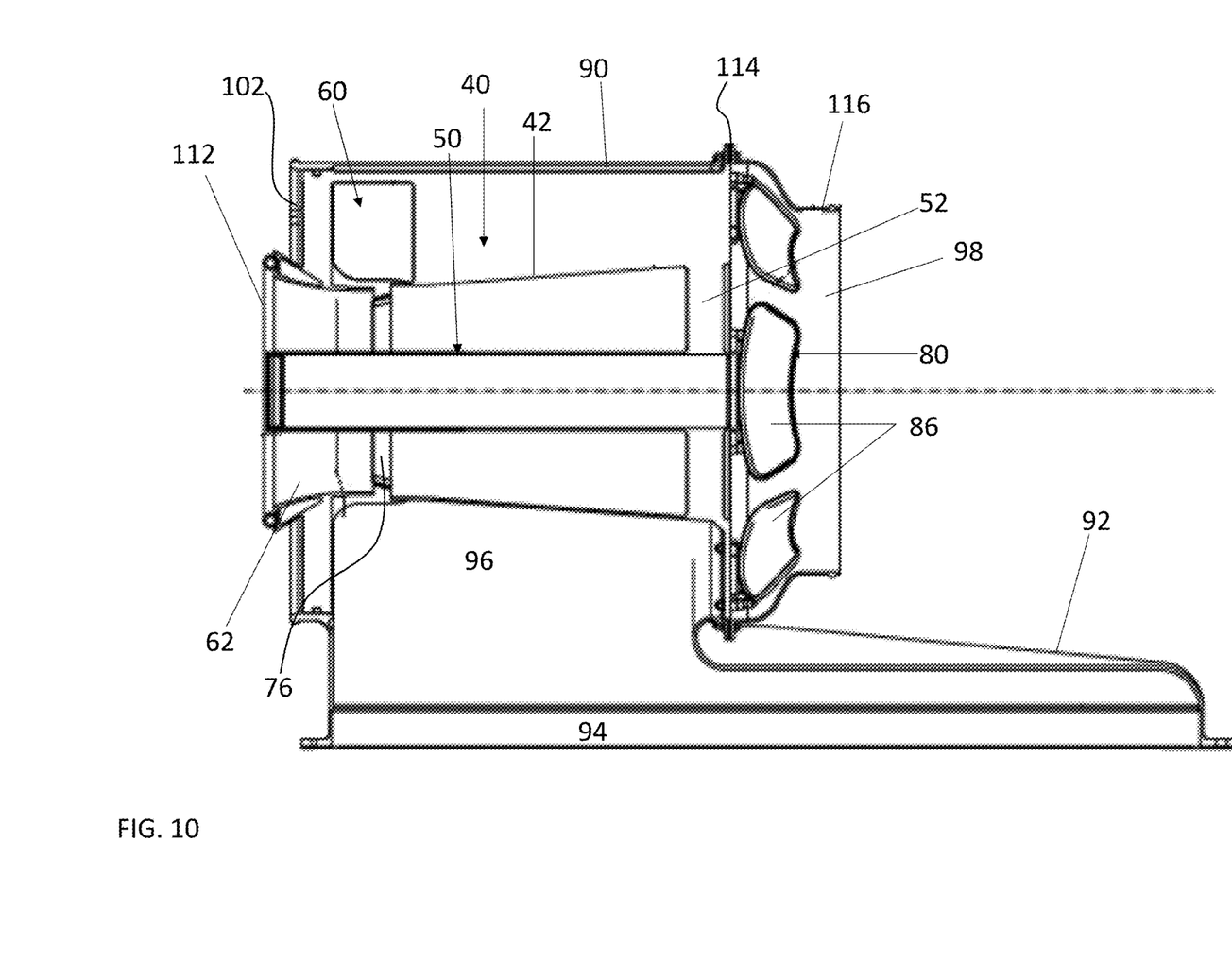
FIG. 10 is a cross-sectional view of the ram air module installed within the ram air duct of FIG. 9 according to an embodiment.
Figure 11:
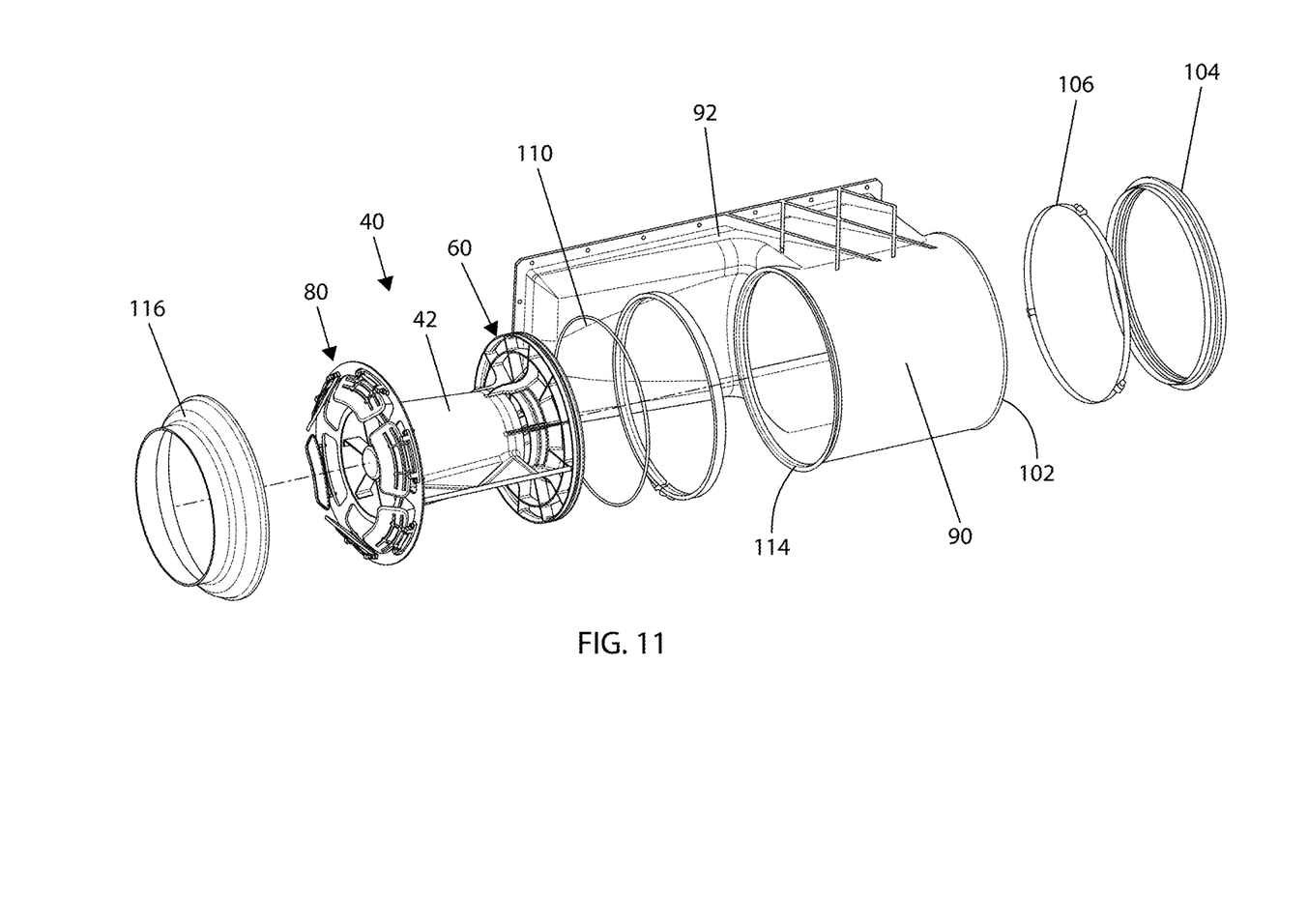
FIG. 11 is an exploded front perspective view of the ram air module installed within the ram air duct according to an embodiment.
Figure 12:
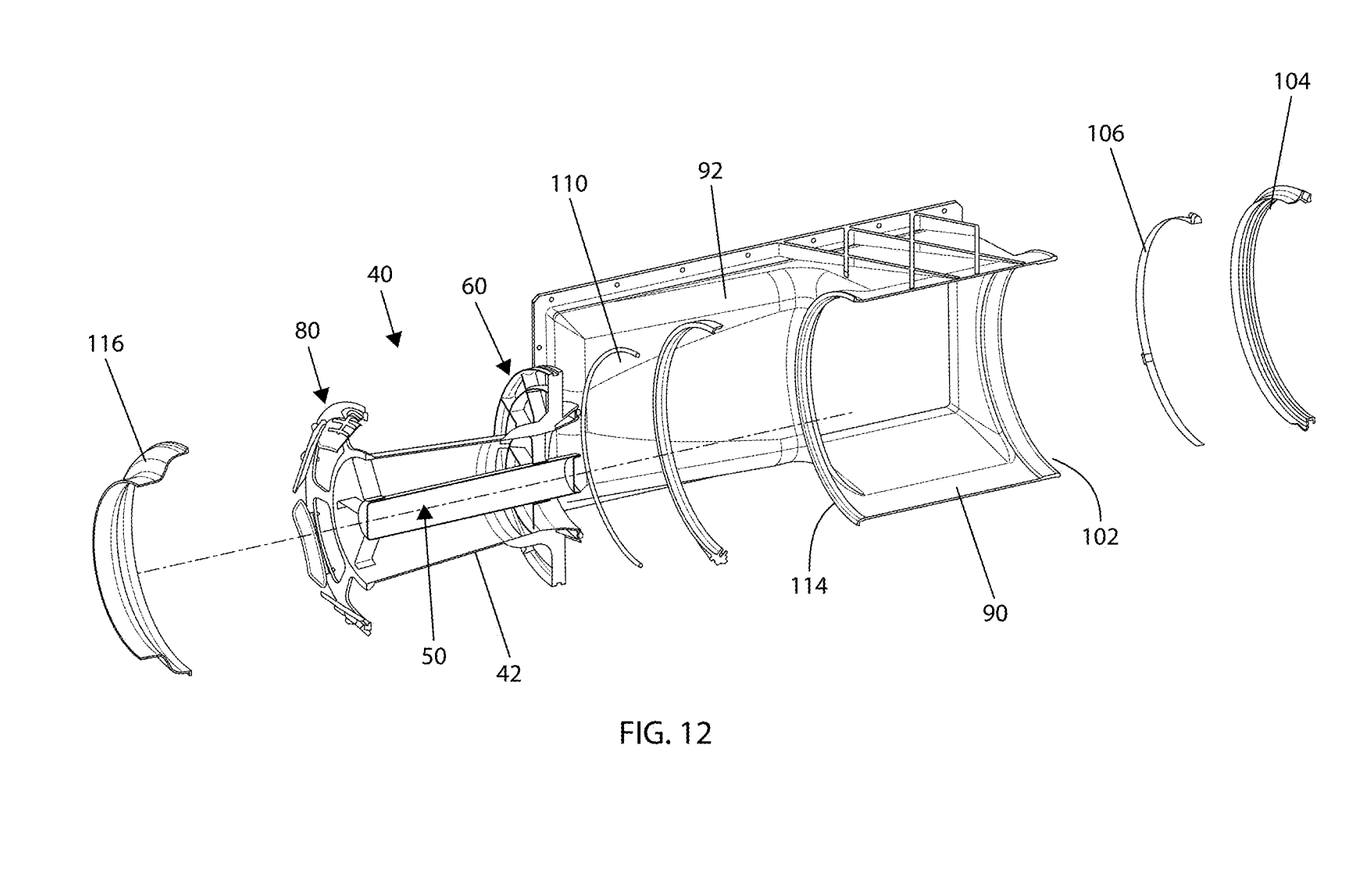
FIG. 12 is a cross-sectional view of the ram air module installed within the ram air duct of FIG. 11 according to an embodiment.

The ram air module 40 is positionable within the interior of the ram air duct 22. With reference to FIGS. 5-12, in an embodiment, the ram air duct 22 includes an annular housing 90 connected to a flange 92 to define a heat exchanger section 94, an inlet section 96, an outlet section 98. The heat exchanger section 94, which houses the one or more heat exchangers 26, is connected to the annular housing 90 via the inlet section 96. In an embodiment, an inner diameter of the annular housing 90 may be generally equal to, or greater than the outer diameter of the flow diverter assembly 60 and the flange 82 of the valve 80. When the ram air module 40 is mounted within the ram air duct, the diffuser body 42 is axially aligned with the fan 24 on a central axis. As best shown in FIG. 6, the diffuser body 42 divides the space within the annular housing 90 into a fan duct extending through the diffuser and a bypass duct arranged generally concentrically with the fan duct. In the illustrated embodiment, the airflow provided to the annular housing 90 may be a high-velocity airflow during flight.

A turnabout section 100 is connectable to a first end 102 of the annular housing 90, such as with a booted V-flange 104 and/or a clamp 106 (see FIGS. 11 and 12) for example. The turnabout section 100 may be at least partially defined by a fan housing, or alternatively, in embodiments where the fan 24 is part of an air cycle machine (ACM) of the environmental control system 10, may be partially defined by the housing 108 of the air cycle machine. As shown in FIGS. 5 and 6, an end of the fan housing or housing 108 of the air cycle machine has a diameter generally equal to the end 102 of the annular housing 90 and is connectable thereto to define a fluid flow path extending from the inlet section 96 and having a 180 degree turn to direct the fluid flow from the inlet section 96 to the fan 24. In the illustrated, non-limiting embodiment the turnabout section 100 has a hemitoroidal shape; however, other suitable configurations of the turnabout section 100 are also within the scope of the disclosure.

When the turnabout section 100 is coupled to the annular housing 90, the nozzle 62 of the flow diverter assembly 60 may couple to an end of the shroud surrounding the fan. In an embodiment, a first seal 110, such as an O-ring seal for example, is positioned adjacent at a surface of the casing 68 of the flow diverter assembly 60. Alternatively, or in addition, an upstream end of the nozzle 62, best shown in FIG. 3, may have a second seal 112 such that when the ram air module 40 is installed within the ram air duct 22, the nozzle 62 is in sealing engagement with a corresponding surface of the fan or ACM housing 108. In embodiments including this sealing engagement, the fan 24 may be directly upstream from the interior of the nozzle 62 of the flow diverter assembly 60.

When the ram air module 40 is installed within the annular housing 90, the valve 80 is positioned adjacent a second end 114 of annular housing 90. The outlet section 98 includes a duct or shroud 116 that extends from the second end of the annular housing in a direction away from the diffuser body.

In operation, a flow of ram air enters the heat exchanger section 94 of the ram air duct 22 after passing sequentially or in parallel over the one or more heat exchangers 26 located therein. From the heat exchanger section 94, the warmer ram air is provided to the inlet section 96 between the heat exchanger section 94 and the annular housing 90. Within the annular housing 90, the ram air flows around the diffuser body 42. When the pressure of the ram air within the annular housing 90 is set below a threshold associated with movement of the valve elements 86 of the check valve 80, the bypass openings 84 are closed. As a result, the ram air flows through the plurality of elements 64, 70 of the flow diverter assembly 60 and into the turnabout section 100. The turnabout section 100 redirects the flow of ram air 180 degrees from the flow out of the annular housing 90 to the fan 24. From the fan 24, the flow of ram air $A_{ram}$ passes through the 62 of the flow diverter assembly 60. At least a portion of the ram air $A_{ram}$ passes through the ejector gap and through the interior 48 of the diffuser body 42, around the center body 50, where the flow is output from the outlet end 46 of the diffuser body 42 into the outlet section 98.

The valve 80 and fan 24 operate together to switch airflow from series flow through the annular housing 90 and the interior 48 of the diffuser body 42 to parallel flow through annular housing 90 and the interior 48 of the diffuser body 42. The position of the valve 80 determines how much, if any, ram air is permitted to flow directly into the outlet section 98 from the inlet section 96 as bypass air, thereby bypassing the fan 24 and the diffuser. In an embodiment, the level of flow through the valve 80 is determined in part based on the flight status of the aircraft.

The ram air module 40 as illustrated and described herein has a compact configuration that contributes to reducing the overall size of the environmental control system. Further, by forming all or a portion of the ram air module via casting or an additive manufacturing process, the cost of the components integrated into the module may be reduced compared to systems where the components are separate components. In addition, by integrating the diffuser and valve into a single cartridge or module, the module can be easily replaced in the event of damage or a failure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ram air module for use in a ram air system, the ram air module comprising:
    a diffuser having a diffuser body including an inlet end and an outlet end;
    a valve connected to the outlet end of the diffuser body; and
    a flow diverter assembly connected to and arranged upstream from the inlet end of the diffuser body relative to a flow through the diffuser body, the flow diverter assembly including a nozzle and a plurality of elements extending from the nozzle, the plurality of elements including at least one circumferential element radially spaced from the nozzle and extending about a periphery of the nozzle, a plurality of passages being defined between the plurality elements, the plurality of passages being arranged upstream from the nozzle relative to a flow through the ram air module;

wherein the inlet end of the diffuser body is axially offset from an end of the nozzle in a direction of the flow through the diffuser by an axial clearance, the axial clearance being an ejector and wherein the plurality of elements extend outwardly radially beyond the body such that the flow passes through the ejector and the plurality of passages in series.

2. The ram air module of claim 1, wherein the diffuser, the flow diverter assembly, and the valve are integrally formed.

3. The ram air module of claim 1, wherein the valve further comprises:
a flange extending radially outwardly from the diffuser body adjacent the outlet end of the diffuser body;
at least one bypass opening formed in the flange; and
at least one valve element mounted to the flange adjacent the at least one bypass opening, the at least one valve element being movable between a first position when the at least one bypass opening is closed and a second position where the at least one bypass opening is at least partially open.

4. The ram air module of claim 3, further comprising at least one biasing mechanism operably coupled to the at least one valve element, wherein a biasing force of the at least one biasing mechanism biases the at least one valve element to the first position.

5. The ram air module of claim 1, further comprising a flow blocker extending radially outwardly from an exterior of the diffuser body.

6. The ram air module of claim 1, further comprising a center body positioned within a hollow interior of the diffuser body.

7. The ram air module of claim 1, wherein the plurality of elements are configured to straighten a flow as it passes through the plurality of flow passages.

8. The ram air module of claim 1, wherein the ram air module is receivable within a ram air duct of the ram air system.

9. The ram air module of claim 8, wherein the diffuser, the valve, and at least a portion of the flow diverter assembly is positionable within an annular housing of the ram air duct.

10. The ram air module of claim 1, wherein the ram air module is interconnected with an environmental control system.

11. A ram air system of a vehicle comprising:
a ram air duct having an inlet for receiving an ambient airflow and an outlet for discharging the ambient air flow overboard, the ram air duct comprising:
an annular housing; and
a flange connected to the annular housing; and
a ram air module removably mountable within the annular housing, the ram air module including:
a diffuser;
a valve connected to the diffuser; and
a flow diverter assembly connected to the diffuser, the flow diverter assembly including:
a nozzle; and
a plurality of elements extending from the nozzle including at least one circumferential element radially spaced from the nozzle and extending about a periphery of the nozzle, a plurality of passages being defined between the plurality of elements, at least one of the plurality of passages being arranged outwardly radially beyond a body of the diffuser at a location upstream from the nozzle relative to a flow through the ram air module.

12. The ram air system of claim 11, wherein when the ram air module is mounted within the annular housing, the diffuser defines a fan duct and a bypass duct.

13. The ram air system of claim 11, wherein the diffuser, the flow diverter assembly, and the valve are integrally formed.

14. The ram air system of claim 11, further comprising:
a fan for moving the ambient air from the inlet to the outlet; and
a fan housing surrounding at least a portion of the fan, wherein the fan housing is connectable with the annular housing to define a turnabout section of a flow path extending between the inlet and the outlet.

15. The ram air system of claim 14, wherein when the fan housing is connected to the annular housing, the fan is positioned at least partially within the nozzle.

16. The ram air system of claim 15, wherein an end of the nozzle is offset from an adjacent end of the diffuser by a clearance, and the clearance defines a recirculation flow path from the nozzle to an inlet of the fan.

17. The ram air system of claim 11, wherein the valve includes a check valve.

18. The ram air system of claim 11, wherein the ram air duct is interconnected with an environmental control system.

* * * * *